United States Patent [19]

Brock

[11] Patent Number: 4,782,791
[45] Date of Patent: Nov. 8, 1988

[54] ANIMAL HOLDER

[76] Inventor: Grady Brock, P.O. Box 420, Rt. #1, Arabi, Ga. 31712

[21] Appl. No.: 99,245

[22] Filed: Sep. 21, 1987

[51] Int. Cl.⁴ .......................... A01K 15/04; A61D 3/00
[52] U.S. Cl. .......................................... 119/99; 119/98
[58] Field of Search ................ 119/98, 99, 147 R, 27, 119/20

[56] References Cited

U.S. PATENT DOCUMENTS

| | | | |
|---|---|---|---|
| Re. 24,517 | 8/1958 | Cederberg | 119/98 |
| 2,861,546 | 11/1958 | Stroup | 119/98 |
| 3,024,766 | 3/1962 | Eveland | 119/27 |
| 3,814,060 | 6/1974 | Swenson | 119/98 |
| 3,885,527 | 5/1975 | Maffey | 119/98 |
| 4,244,324 | 1/1981 | Kratky | 119/98 |
| 4,312,299 | 1/1982 | Leiker | 119/98 |
| 4,498,425 | 2/1985 | Aanestad | 119/98 |
| 4,574,741 | 3/1986 | Mahler | 119/98 |
| 4,579,084 | 4/1986 | McCan et al. | 119/147 R |

Primary Examiner—Paul J. Hirsch
Attorney, Agent, or Firm—Jones, Askew & Lunsford

[57] ABSTRACT

A holder for receiving and temporarily immobilizing animals such as livestock or the like while undergoing vaccination or other treatment. The holder comprises a pair of relatively lightweight frame members, pivotably interconnected at the forward end of the holder. An opening for the neck of the animal is defined between vertical bars at the forward end; this opening accommodates only the neck of the animal when the holder is closed, but enlarges for withdrawing the animal's head when the holder is open. Both entry and exit of the animal occur through the back end of the holder. The animal holder is relatively lightweight and is intended for temporary attachment to a fixed object while the holder is in use.

15 Claims, 2 Drawing Sheets

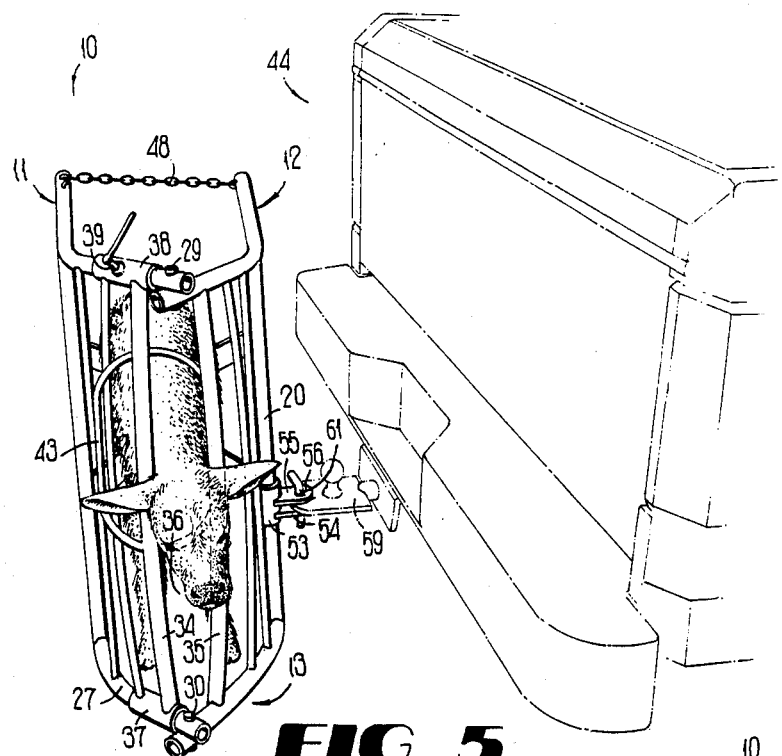
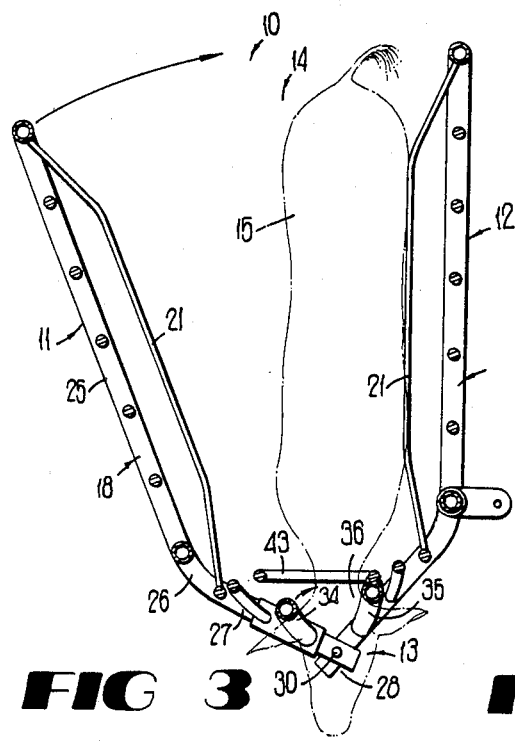
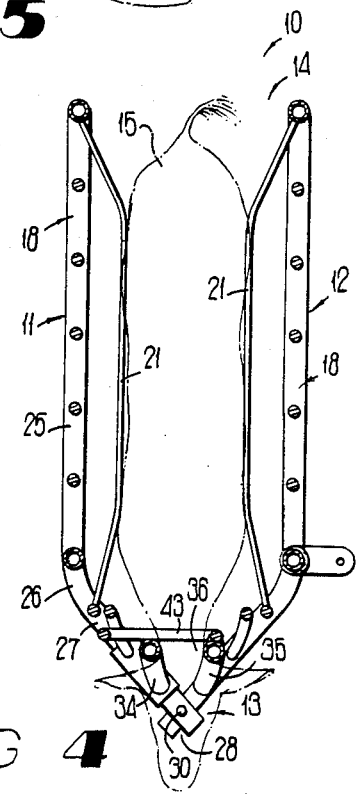
FIG 5
FIG 3
FIG 4

ANIMAL HOLDER

FIELD OF THE INVENTION

This invention relates in general to apparatus for holding animals, and relates in particular to apparatus for temporarily holding and restraining animals such as livestock or the like.

BACKGROUND OF THE INVENTION

Animals such as calves, lambs, and other livestock usually undergo treatment by a farmer or veterinarian, preferably while the animal is young. These treatments may include administering medicine orally or by injection to protect the animal from various diseases, implants to stimulate growth of the animal, and ear tags for identifying the particular animal, or surgical procedures.

Livestock and other animals of similar size usually are temporarily restrained while the shots or other procedures are administered. This restraint is necessary both for effective treatment of the animal and for the safety of the person treating the animal; even a young calf can kick or step on anyone trying to vaccinate it. Consequently, various devices have been developed for temporarily holding and restraining livestock while allowing access to the body and head of the animal for treatment.

The known animal holding mechanisms generally are designed for larger or relatively mature livestock, and those mechanisms are correspondingly large and expensive. One such apparatus is known as a squeeze chute. Usually located at one end of a chute or alley into which animals are herded in single file, the squeeze chute temporarily restrains the animal with its hip and neck extending through an opening in the front doors of the chute. After the animal is treated, the operator opens the front doors of the squeeze chute and the animal exits through the front of the chute, making way for another animal entering the back of the chute as soon as the chute front doors are again closed. These chutes of the prior art are of necessity relatively heavy and immobile; the chutes are designed to restrain beef cattle, and the chutes must be heavy enough to stay put against the struggling of an animal restrained in the chute. These prior-art chutes typically are heavy enough to require a trailer for transporting the chute from place to place, and a cattleman working alone cannot easily carry one of these chutes to a field for treating cattle, and then move the chute somewhere else for treating other cattle or for storing the chute. Moreover, such restraining chutes are relatively expensive and represent a major expense to the small cattleman.

Another problem encountered with the chutes of the prior art is that the chutes are too large for effectively holding smaller animals, such as young calves or lambs. Merely scaling down the existing chutes in size to accommodate smaller animals, does not significantly overcome the previously mentioned problems with these chutes. Furthermore, downsizing the existing chutes to accommodate younger or smaller animals requires the cattleman to double his investment in chutes, an expense which many small operators cannot afford.

Another kind of cattle restraint in the prior art is known as the tipping calf table. With the tipping table, a calf or other animal first enters a chute-like structure for restraint, and the structure is then rotated 90° to place the calf on its side. Once vaccination or other treatment is completed, the structure is returned to the upright position and the front gate of the chute opened, allowing the calf to leave the restraining apparatus. These tipping calf tables, as with other animal holders known to the art, are of necessity relatively heavy to hold a struggling animal, and represent a substantial expense to the relatively small operator.

SUMMARY OF THE INVENTION

Stated in general terms, the animal holding apparatus of the present invention is intended for holding relatively small animals such as lambs or young calves, and is intended for temporary attachment to a stationary object such as a truck or fence while the animal holder is in use. The present animal holder thus is relatively lightweight and is easily used or moved by one person, because the animal holder does not depend alone upon its own size and mass to remain immobile while holding a struggling animal.

Stated somewhat more specifically, the present animal holder includes a pair of upright frame members pivotably connected together at a forward end of the animal holder, and open at the back end for allowing the animal to enter the holder. The frame members are pivotably moveable between open and closed positions and in the closed position the frame members press against the sides of an animal within a frame, thereby restraining the animal against lateral movement.

The front end of the frame includes an opening whose width varies as the frames are pivoted open or closed. In the open position, the space at the front end of the frames is wide enough to permit passage of the head and neck, but not the body, of an animal entering the open frame through the back end of the apparatus. Once the animal enters the frame with its head and neck extending through the opening, the operator pivots the frame to the closed position, where the size of the front-end opening is reduced to accommodate only the neck of the animal. The frame is then latched in the closed position, restraining the sides of the animal as mentioned above. The young or small animal is now immobilized with its head extending forwardly through the opening at the front of the apparatus. The frame members are preferably of open construction, allowing substantially free access to the hips and sides of the animal for vaccination or the like.

Once the animal is treated, the frame is unlatched and returned to the open position, again enlarging the opening at the front of the frame to permit passage of the animal's head, but not its body. The animal is now free to back out of the frame. Because the apparatus while in use is rigidly secured to a suitable stationary object, the apparatus needs only the structural strength necessary for restraining the animal and undergoing normal wear and tear, instead of the far heavier construction required of animal holders in the prior art.

Accordingly, it is an object of the present invention to provide an improved animal holding apparatus.

It is another object of the present invention to provide an animal holding apparatus of relatively lightweight construction.

It is a further object of the present invention to provide an animal holding apparatus capable of being transported and used by a single operator.

It is still another object of the present invention to provide an animal holding apparatus which does not rely on its own size and mass for stability, and which consequently can be of relatively lightweight and inexpensive construction.

Other objects and attendant advantages of the present invention will become more readily apparent from the following description of a preferred embodiment.

BRIEF DESCRIPTION OF DRAWINGS

FIG. 3 is a top sectional view of the animal holder seen as in FIG. 1.

FIG. 4 is a top sectional view of the animal holder as seen in FIG. 2.

FIG. 5 is a front pictorial view showing the animal holder of FIG. 2 anchored to a stationary object.

DESCRIPTION OF PREFERRED EMBODIMENT

Figure 1:
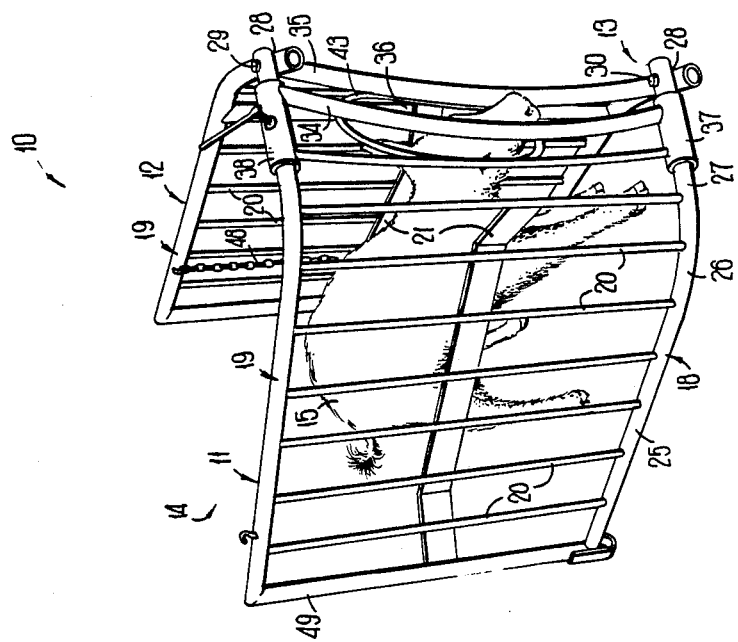
FIG. 1 is a pictorial view showing the open position of an animal holder according to a preferred embodiment of the present invention.
Figure 2:
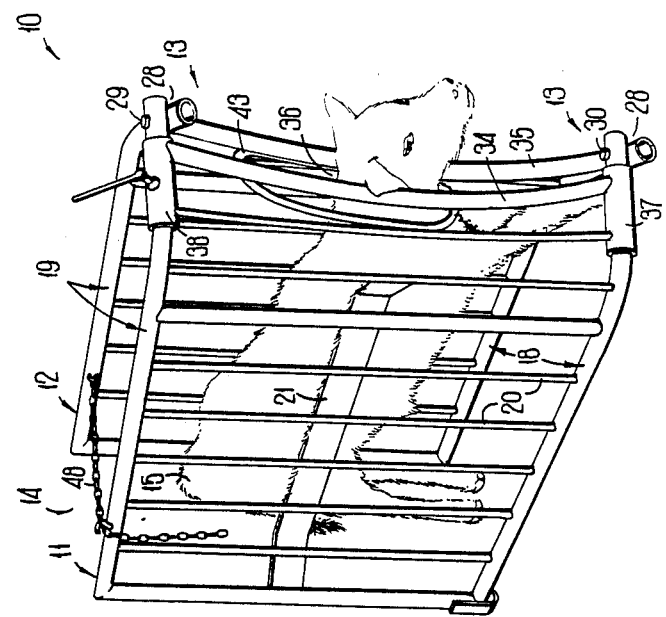
FIG. 2 is a pictorial view showing the animal holder of FIG. 1 in the closed position, with an animal therein.

Turning first to the FIGS. 1 and 2, there is shown generally at 10 an animal holder having a pair of upright frame members 11 and 12 pivotably connected together at the front end 13 of the animal holder. FIG. 2 shows the animal holder 10 in a closed position, with the back end 14 of the animal holder being open in that position. An open position of the animal holder 10 is shown in FIG. 1 with the open back end 14 enlarged to accommodate entry or exit of an animal 15 from the animal holder.

The frame members 11 and 12 each have a lower side member 18 for supporting the animal holder 10 on the ground or other work surface, and an upper side member 19 located above and substantially parallel to the lower side member. The side members 18 and 19 of each frame member can be hollow tubing for lightness of weight, or can alternatively be fabricated from solid bar stock or the like for added rigidity.

A number of vertical bars 20 extend between the lower and upper side members 18 and 19 of each frame member. These bars 20 support the side members 18 and 19 in parallel spaced-apart relation, and the bars are preferably spaced apart from each other sufficiently to restrain an animal 15 within the holder 10 while permitting maximum access to the animal from outside the side members. Approximately midway between the lower and upper side members 18 and 19 on each frame member 10 and 11 is attached a flank support panel 21, which is permanently attached on the inner sides of the side members. The flank support panels 21 are preferably positioned to contact an animal within the holder 10 approximately midway on the height of the animal's body. These flank support panels 21, instead of the individual bars 20 of the side members, engage the animal's body and provide lateral restraint for an animal within the holder 10 while protecting the animal's body from injury by the bars.

Each frame member 11 and 12 includes a substantially straight main portion 25 extending forwardly from the open back end 14. The length of the main portion 25 is preferably at least as long as the body length of animals for which a particular holder 10 is intended. At the forward end 26 of each main portion 25, the lower and upper side members 18 and 19 bend inwardly and converge toward each other, terminating approximately at the closed front end 13 of the holder. These inwardly-converging portions of the lower and upper side members 18 and 19 define the forward portions 27 of the frame members 11 and 12. The forwardmost ends 28 of the upper side members 18 overlap each other as best seen in FIGS. 3-5, and a bolt 29 extends vertically through those overlapping ends to interconnect the frame members. The bolt 29 also in part defines a vertical axis about which the frame members 11 and 12 are pivoted between the open and closed positions of the holder 10, as previously mentioned. The lower side members 18 likewise overlap at the front end 13 of the holder 10, and these overlapping lower ends are pivotably secured together by another bolt 30 coaxial with the bolt 29 at the upper side of the interconnected frame members 11 and 12.

Turning now to FIGS. 3-5, the front end 13 of the frame members 11 and 12 includes the respective vertical bars 34 and 35, extending between the lower and upper side members 18 and 19 of each frame member. Each vertical bar 34 and 35 is bowed outwardly relative to the other vertical bar, thereby defining an opening 36 between the two vertical bars 34, 35. With the frame members 11 and 12 pivoted to the closed position as shown in FIGS. 2 and 4, the lateral width of the opening 36 between the vertical bars 34 and 35 is just wide enough to comfortably receive the neck of an animal 15 (for example, a young calf up to a certain age) for which a particular embodiment of the animal holder 10 is designed. For example, where a particular animal holder 10 is intended for holding and restraining young calves up to a certain maximum weight or size, the lateral width of the opening 36 should just accommodate the neck thickness of the calves. However, the opening 36 should not permit passage either of the animal's body or its head while the frame members 11 and 12 are closed.

Referring again to FIGS. 3-5, it is seen that the vertical bars 34 and 35 are positioned back a short distance from the forward ends of the forward portions 27, and are thus radially offset from the pivot axis defined by the bolts 29 and 30. Accordingly, as the frame members 11 and 12 are respectively pivoted about that axis to the opening position shown in FIGS. 1 and 3, the enlarged lateral width of the opening 36 increases as the vertical bars 34 and 35 move away from each other. When the frame members 11 and 12 are in the open position, the enlarged lateral width of the opening 36 is sufficient to accommodate withdrawal of the animal's head, as the animal backs out of the opened animal holder 10. However, even in the open position of the holder 10 the opening 36 remains too small for the animal's body to pass through the opening. Thus, the animal must enter and exit the holder 10 through the open back end 14, not through the front end 13 which at all times remains blocked to complete passage of the animal.

The width of the opening 36 is adjustable within limits by lateral movement of the vertical bar 34, whose ends attach to the lower and upper sleeves 37 and 38 slidable along part of the forward portions 27 of the lower and upper side members 18 and 19. A setscrew 39 carried by the upper sleeve 38 secures a desired position of the vertical bar 34. This lateral adjustment feature of the opening 36 allows a particular animal holder 10 to accommodate animals having a range of neck sizes, before outgrowing that particular holder.

The animal holder 10 is equipped with a guide in the form of an oblong loop 43 supported a short distance behind the opening 36 between the vertical bars 34 and 35, and substantially in longitudinal alignment with that opening. The loop 43 is secured in place by welding or otherwise attaching to the vertical bar 35, or to an appropriate one of the bars 20 extending between the lower and upper side members 18 and 19 of the frame member 12. The loop 43 helps an animal, upon entering the holder 10, direct its head toward and through the opening 36 between the vertical bars 34 and 35. The size and placement of the loop prevent the animal 15 from moving more than its head and neck through the loop; the loop also helps restrain the animal from moving its neck sideways, while in the closed animal holder.

The operation of the present animal holder 10 is as follows. It should now be understood that the disclosed embodiment of the present animal holder is relatively light in weight, lacking any floor panels and the solid front doors and other relatively massive structure associated with typical animal holders of the prior art. Before the present animal holder 10 is put to use, the animal holder is first secured to a relatively stationary object. For example, the animal holder 10 can be placed alongside a fence (not shown), and secured to the fence by a length of chain is attached to the upper side 19 of the frame member 11 attaching the animal holder to a stationary object. The relatively lightweight animal holder 10 thus is quickly and easily positioned against the fence or another stationary object and secured in place by a single operator.

Once a frame number 11 or 12 of the holder 10 is secured to a fixed object, the other frame member is pivoted open to the position shown in FIGS. 1 and 3. An animal 15 is now moved into the open back end 14 of the holder until the animal's head and neck pass through the loop 43 and enter the opening 36 between the vertical bars 34 and 35. As previously mentioned, both the loop 43 and the lateral dimension of the opening 36 are too small to permit passage of the animal's body. In particular, the loop 43 engages and restrains the front part of the animal's body as shown in FIG. 3, keeping the animal from moving forwardly within the holder 10 beyond the optimum position of its neck between the vertical bars 34 and 35. The operator then pivots the free frame member 11 to the closed position shown in FIGS. 2 and 4, and latches the frame members in the closed position by means of the chain 48 (FIG. 5) detachably interconnecting the vertical supports 49 at the back ends of the frame members. The animal is now substantially immobilized within the holder 10, its flanks being pressed on either side by the flank support panels 21 extending along the frame members 11 and 12. In this immobilized position the operator can administer shots or other treatment to the animal, with safety to the animal and to the operator.

Once the treatment is completed, the chain 48 at the back end 14 of the holder 10 is released, and the unattached frame member 12 is pivoted to the open position. This movement of the frame member 12 releases the animal's flanks and concurrently enlarges the opening 36 between the vertical bars 34 and 35, allowing the animal to exit the holder 10 from the back end 14.

FIG. 5 also shows an alternative attachment device for immobilizing the animal holder 10 in locations lacking a permanent moveable structure such as a fence or a tree. A collar 53 is slidable on one of the vertical bars 20 making up one of the frame members, for example, the frame member 12. Attached to this collar 53 is a pair of flat plates extending outwardly from the collar to form a clevis 54. A pair of aligned openings 56 extends through the plate members 54 and 55. The clevis 54 is dimensioned to receive the hitch plate 59 of a trailer hitch on to the back of the truck 44 or other vehicle. A hole extends through the hitch plate 59, and this hole becomes aligned with the pair of coaxial openings in the plates making up the clevis 54 when the clevis is positioned on the hitch plate 59. A pin 61 is then dropped through the aligned holes in the clevis 44 and the hitch plate 59 thereby securing the clevis securely to the hitch plate of the vehicle. In this way, the animal holder 10 is quickly immobilized and ready for use, even in an open field or another location lacking in a existing fixed object for securing the animal holder.

It should be apparent that the foregoing relates only to a preferred embodiment of the present invention, and that numerous changes and modifications thereto may be made without departing from the spirit and scope of the invention as defined in the following claims.

I claim:

1. Apparatus for temporarily holding an animal of certain size, comprising:
   a pair of substantially upright frames each having a lower side for placement on an unattached subjacent support surface, each frame including side means extending upwardly to an upper side at least sufficient to provide external restraint for an animal between said frames;
   each frame having a front end and a back end;
   the frames being hingedly connected to each other at the front ends thereof so that the frames can selectively pivotably assume either a closed position where the front ends and the back ends of the frames are in mutually confronting spaced apart relation with the side means snugly engaging the sides of an animal between the frames, or an open position where the front ends remain in relatively close spaced apart relation and the back ends of the frames are relatively far apart, releasing the sides of the animal; and
   means on the front ends of the frames defining a space sufficiently wide to receive the neck of the animal without permitting passage of the animal's head or shoulder when the frames are in the closed position engaging the sides of the animal, and sufficiently wide to permit passage of the animal's head but not forward passage of the body when the frames are in the open position releasing the sides of the animal, so that the animal is restrained within the closed frames and is free to enter or exit the open frames only at the relatively widely spaced apart back ends thereof.

2. A holding apparatus as in claim 1, further comprising means selectively securing said frames in the closed position so as to prevent an animal from opening the frames and backing out of the holding apparatus.

3. A holding apparatus as in claim 1, further comprising means connected to one of said frames for securing the frame to a stationary object, so as to immobilize the holding apparatus against the movement of an animal therein.

4. A holding apparatus as in claim 3 wherein said means for securing comprises:
   a fastening device attached to a frame for undergoing a range of vertical movement between upper and lower edges of the frame; and
   means associated with said fastening devices for securement to a stationary object.

5. A holding apparatus as in claim 4, wherein:
   the one frame comprises an elongate member extending between said upper and lower edges;

the fastening device comprises a sleeve slidable on the elongate member for said range of vertical movement; and a clevis connected to the sleeve and extending outwardly from the frame for attachment to an adjacent stationary object located within the range of vertical movement of the clevis.

6. A holding apparatus as in claim 1, wherein:

said means at the front of the frames comprises an upright member on one frame extending in spaced apart relation to a confronting portion of the other frame, the space between the upright frame and the confronting portion comprising said space to receive the neck of the animal; and the upright member being operative to move away from the confronting portion of the other frame in response to moving the frames about the hinge connections to the open position, so that said space is thereby increased to permit passage of the head but not the body of the animal.

7. A holding apparatus as in claim 6, wherein:

said upright member is a first such member and is disposed between the lower and upper sides of the one frame; and further comprising a second upright member at the front of the other frame, disposed between the lower and upper sides of the other frame and confronting the first upright member so that the space between the first and second upright members comprises the space for receiving the neck of the animal; and at least one of the upright members is bowed outwardly away from the other upright member to provide an enlarged space permitting passage of the animal's head only when the frames are in the open position.

8. A holding apparatus as in claim 7, wherein:

one of the said first and second upright members is selectively moveable, independently of the hinge connection of the frames, to adjust the amount of space between the first and second upright members, thereby accommodating animals having a range of neck sizes.

9. A holding apparatus as in claim 6, wherein:

the upright member is radially displaced from the hinge connections and is angularly offset from the confronting portion of the other frame when in the closed position, so that the upright member moves away from the confronting member as the frames are moved from the closed position to the open position.

10. Animal holding apparatus comprising:

a pair of substantially upright side frames each having a lower member free for placement on an unattached subjacent surface for supporting the apparatus;

the frames being pivotably attached to each other at a front end of each frame and unattached at the back ends thereof, so that the frames are pivotably moveable on a substantially vertical axis at the front end either to a closed position wherein the front end and the back ends of the frames are in relatively close mutually spaced apart relation, or to an open position wherein the front ends remain in relatively close mutually spaced apart relation and the back ends are relatively widely spaced apart from each other:

each frame having an elongated side portion contacting a corresponding side of the animal located between the closed frames, and having a forward portion angled inwardly from the side portion;

said forward portions of the frames converging toward each other at a point in front of the side portions;

hinge means connecting together the forward portions of the frames along a vertical axis of pivotable movement, thereby providing said pivotable movement of the frame members;

means mounted on the forward portions and defining an opening between the frames wide enough to accommodate the neck of the animal but not the animal's head or body when the frames are closed with side portions contacting the body of the animal, and wide enough to permit withdrawal of the animal's head but still blocking passage of the body between the front ends of the frames when the frames are pivoted to the open position, so that the animal must enter and leave the apparatus between the back ends of the frames when in the open position; and means selectively holding the frames in the closed position;

whereby the side frames are pivotably interconnected without requiring separate connected superstructure, so that the animal holding apparatus remains relatively lightweight and easy to move when not in use.

11. Apparatus as in claim 10, wherein:

said forward portions each comprise an upright member bowed outwardly from the other upright member so as to define said opening between the upright members; and at least one such upright member being spaced apart from the vertical axis of pivotable movement, so that moving the frames from closed to open positions increases the spaces between the upright members and thereby widens the opening.

12. Apparatus as in claim 11, wherein:

one of said upright members is selectively moveable along the corresponding side portion, thereby adjusting the width of the opening to accommodate different thicknesses of animal necks.

13. Apparatus as in claim 10, further comprising:

a rigid loop member carried by a frame, the loop member being located behind and substantially aligned with the opening between the frames;

the loop permitting unimpeded entry and withdrawal for the head and neck of the animal, thereby guiding the animal to the opening between the frames, but being sized to prevent entry of the animal's body and thereby keeping the animal from attempting further forward movement through the frames when in the open position.

14. Animal holding apparatus as in claim 10, wherein:

the lower member of each side frame has a substantially straight elongated portion extending along the side portion of the side frame, and a forward portion unitary with the straight portion and angled inwardly therefrom;

the side frames each further comprising an upper member having a substantially straight elongated portion substantially parallel to the lower member in said side portion and said inwardly angled portion;

the inwardly angled portions of the lower members overlapping each other;

a first hinge member pivotably interconnecting the overlapping portions of the lower members;

the inwardly angled portions of the upper members overlapping each other; and a second hinge member coaxial with the first hinge member and pivotably interconnecting the overlapping portions of the upper members, so that the side frames are pivotably interconnected with each other at the front ends.

15. Apparatus as in claim 14, wherein:

said forward portions each comprise an upright member joined to and extending vertically between the corresponding lower and upper members and bowed outwardly from the other upright member so as to define said opening between the upright members; and at least one such upright member being spaced apart from the vertical axis of pivotable movement, so that moving the frames from closed to open positions increases the spaces between the upright members and thereby widens the opening sufficiently to permit withdrawal of the animal's head while still blocking passage of the body between the front ends of the frames.

* * * * *